US009405477B2

(12) United States Patent
Ganapathi et al.

(10) Patent No.: US 9,405,477 B2
(45) Date of Patent: Aug. 2, 2016

(54) METHOD AND SYSTEM FOR MAINTAINING RELEASE CONSISTENCY IN SHARED MEMORY PROGRAMMING

(75) Inventors: Ravindra Babu Ganapathi, Hillsboro, OR (US); Hu Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 13/976,616

(22) PCT Filed: Apr. 25, 2012

(86) PCT No.: PCT/CN2012/074638
§ 371 (c)(1),
(2), (4) Date: May 27, 2014

(87) PCT Pub. No.: WO2013/159288
PCT Pub. Date: Oct. 31, 2013

(65) Prior Publication Data
US 2014/0258643 A1     Sep. 11, 2014

(51) Int. Cl.
*G06F 3/06* (2006.01)
*G06F 12/08* (2016.01)

(52) U.S. Cl.
CPC ............ *G06F 3/0614* (2013.01); *G06F 3/0655* (2013.01); *G06F 3/0671* (2013.01); *G06F 12/0822* (2013.01); *G06F 12/08* (2013.01); *G06F 2212/50* (2013.01); *G06F 2212/6026* (2013.01); *G06F 2212/657* (2013.01)

(58) Field of Classification Search
CPC ... G06F 3/0614; G06F 3/0655; G06F 3/0671; G06F 12/08; G06F 12/0822; G06F 2212/50; G06F 2212/6026; G06F 2212/657
See application file for complete search history.

(56) References Cited

U.S. PATENT DOCUMENTS

| 2003/0167420 | A1* | 9/2003 | Parsons | G06F 11/1482 714/10 |
| 2006/0117147 | A1* | 6/2006 | Blinick | G06F 12/0831 711/145 |
| 2006/0143406 | A1 | 6/2006 | Chrysos | |
| 2007/0226424 | A1 | 9/2007 | Clark et al. | |
| 2008/0091884 | A1* | 4/2008 | Piry | G06F 12/0831 711/141 |
| 2010/0118041 | A1 | 5/2010 | Chen et al. | |

FOREIGN PATENT DOCUMENTS

| CN | 101042679 A | 9/2007 |
| CN | 101065736 A | 10/2007 |
| CN | 101088076 A | 12/2007 |
| CN | 101523361 A | 9/2009 |
| WO | 2013159288 A1 | 10/2013 |

OTHER PUBLICATIONS

International Search Report and Written Opinion received for International Application No. PCT/CN2012/074638, mailed Jul. 12, 2012, 10 pages.
"General-Purpose Computing on Graphics Processing Units," Wikipedia, The Free Encyclopedia, available: [http://en.wikipedia.org/w/index.php?title=Generalpurpose_computing_on_graphics_processing_units&oldid=465630228], edited Dec. 13, 2011, 10 pages.

* cited by examiner

*Primary Examiner* — Eric Oberly
(74) *Attorney, Agent, or Firm* — Barnes & Thornburg LLP

(57) ABSTRACT

A method and system for maintaining release consistency in shared memory programming on a computing device having multiple processing units includes, in response to a page fault, initiating a transfer, from one processing unit to another, of data associated with more than one but less than all of the pages of shared memory.

22 Claims, 3 Drawing Sheets

METHOD AND SYSTEM FOR MAINTAINING RELEASE CONSISTENCY IN SHARED MEMORY PROGRAMMING

BACKGROUND

Shared memory refers to memory that can be accessed by more than one processor or processor core in a multiple-processor and/or multi-core computing device or system. When a processor or core needs fast access to memory, data stored in the shared memory may be transferred to a cache. When one processor or cores cache is updated with information that may need to be used by other processors or cores, the other processors or cores need to be aware of the update in order to prevent the several processors or cores from working with incoherent data.

In distributed shared memory systems, software or firmware programming protocols (which may be referred to as "consistency models") may be used to ensure that memory is consistent and the results of memory operations are predictable to all processors and/or cores. In general, consistency models define programming rules for the order and visibility of memory updates. A release consistency model uses two synchronization operations: "release" and "acquire." In the release consistency model, an object has to first be acquired and then later released. After acquiring the object and before releasing it, a processor or core may perform one or more write operations using the object, in which data is written to local memory (local to the acquiring processor or core). Release consistency is considered achieved if write operations by one processor or core are visible to the other processors or cores after the first processor/core releases the object of the write operation and before the other processors/cores acquire it.

Two kinds of protocols that implement release consistency are the "lazy" protocol and the "eager" protocol. In these protocols, all coherence actions are performed on release operations. That is, other processors/cores cannot see the data write until the release operation has been performed. In the lazy protocol, a processor or core does not request pages of virtual memory until the page is accessed; that is, until a page fault occurs. In the eager protocol, all of the accessible pages of virtual memory (e.g., data) are transferred as soon as a computation is offloaded, that is, on an acquire operation.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
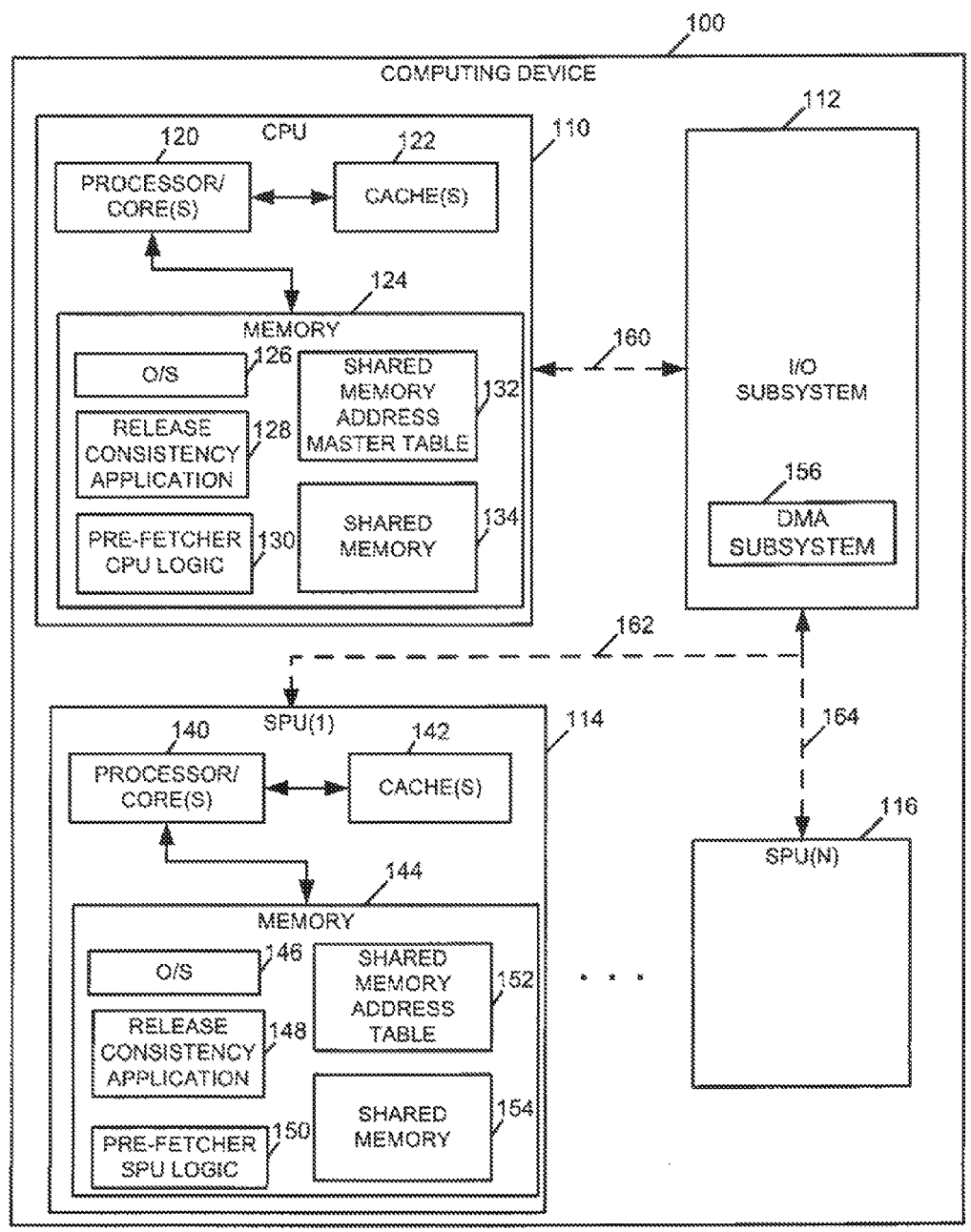
FIG. 1 is a simplified block diagram of at least one embodiment of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands resource, partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, applets, widgets, code fragments and/or others, and that each such instruction may be implemented using any suitable programming language, library, application programming interface (API), and/or other software development tools. For example, some embodiments may be implemented using C, C++, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist in other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative computing device 100 includes a central processing unit (CPU) 110 and one or more special processing units (SPUs) 114, 116, which are coupled to the central processing unit 110 via an input/output (I/O) subsystem 112, according to a shared memory programming model. Some examples of shared memory programming models are disclosed in Chen et al., U.S. Patent Application Publication No. 2010/0118041, filed Dec. 30, 2008. According to the illustrative shared memory model, each of the central processing unit 110 and the one or more special processing units 114, 116 is configured with virtual memory that maps to physical locations in memory 124, 144. The virtual memory includes both private and shared memory space. The private virtual memory space of each of the processing units 110, 114, 116 is not accessible by the other processing units 110, 114, 116. However, the shared virtual memory space (e.g., shared memory 134, 154) of each of the processing units 110, 114, 116 may be accessed by one or more other processing units 110, 114, 116, so that at runtime, data in the shared memory 134, 154 can migrate between caches 122, 142 as it is needed by the corresponding processing units 110, 114, 116. Release consistency application code 128, 148 is embodied in the memory 124, 144 of the processing units 110, 114, 116 and is executable by the processors and/or cores 120, 140, respectively, to maintain release consistency of the data in the shared memory 134, 134. Illustrative examples of the release consistency application code 128, 148 are described in the aforementioned U.S. Patent Application Publication No. 2010/0118041.

As explained further below, pre-fetcher logic 130, 150 embodied in the memory 124, 144 of the processing units 110, 114, 116 enhances the release consistency application code 128, 148 by allowing more than one, but less than all, of the pages of data in the shared memory 134, 154 to be requested and transferred to a cache 122, 142 on demand (e.g., during a page fault). The pre-fetcher logic 130, 150 also allows the number of pages (or amount of data) requested and transferred during a page fault to be customized for particular applications or requirements. For example, the number or amount of pages can be pre-determined or determined at runtime. In some embodiments, the number of pages requested and transferred during a page fault may be determined with reference to a page or list of pages actually needed for execution of a subsequent computer operation. Alternatively or in addition, in some embodiments, the number of pages requested and transferred during a page fault may be based on one or more characteristics of the I/O subsystem 112 such as bandwidth), for example. Thus, the pre-fetcher logic 130, 150 can reduce the page fault overhead by allowing multiple pages to be transferred in response to a single page fault. The pre-fetcher logic, 130, 150 also improves performance by allowing fewer, but larger-sized, data transfers on demand (e.g., during a page fault). Further, since with the pre-fetcher logic 130, 150, the data transfers occur on demand, the pre-fetcher logic 130, 150 eliminates the need to transfer all of the pages up front (as in the eager protocol) and reduces the amount of overhead associated with locating a needed page within a large block of pages. TABLE 1 below includes test data resulting from preliminary experiments utilizing the pre-fetcher logic 130, 150 in the execution of selected computational processes on a heterogeneous computing device in which a central processing unit is connected to a discrete special processing unit via a PCI-Express subsystem, in comparison to the traditional lazy and eager protocols mentioned above.

TABLE 1

| Operation | Technique | | | |
|---|---|---|---|---|
|  | Stencil | BlackScholes | Tree Search | N-Body |
| Pre-fetcher logic | 17.242 s | 7.690 s | 4.631 s | 22.888 s |
| Lazy protocol | 37.112 s | 16.956 s | 6.714 s | 25.222 s |
| Eager protocol | 18.445 s | 13.025 s | 4.701 s | 26.537 s |

The computing device 100 may be embodied in or as any type of computing device, such as, for example, a desktop computer system, a laptop, tablet, notebook, netbook, handheld or mobile computing device, a server, an enterprise computer system, a network of computers, or other electronic device (e.g., "smart" devices such as smart TVs and appliances), depending on the particular application. In some embodiments, the computing device 100 may be embodied using a many integrated core (MIC) architecture. The illustrative central processing unit 110 is embodied as at least one processor and/or processor core or logical section(s) of a single core(s) 120 (which may be referred to herein simply as "nodes" for ease of description). One or more of the nodes 120 may be configured to process multi-threaded computer programs. The nodes 120 include or are communicatively coupled to one or more cache memory 122. The cache(s) 122 may be utilized to temporarily store data and/or instructions during operation of the release consistency application 128, the pre-fetcher CPU logic 130, and/or other components of the computing device 100.

In addition to the cache memory 122, the processor and/or core(s) 120 include, or are otherwise communicatively coupled to, the memory 124. Portions of the memory 124 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The central processing unit 110 is also communicatively coupled to the I/O subsystem 112. Although not specifically shown, the illustrative I/O subsystem 112 may be embodied as a memory controller (e.g., a memory controller hub (MCH) or northbridge), an input/output controller (e.g., an input/output controller hub (ICH) or southbridge), and a firmware device. Of course, in other embodiments. I/O subsystems having other configurations may be used. For example, in some embodiments, the I/O subsystem 112 may form a portion of a system-on-a-chip (SoC) and be incorporated, along with the processor 110 and other components of the computing device 100, on a single integrated circuit chip. As such, it will be appreciated that each component of the I/O subsystem 112 may be located on a common integrated circuit chip in some embodiments. Moreover, in some embodiments, one or more of the processing unit 110, I/O subsystem 112, and/or SPUs 114, 116 may be located on a common integrated circuit chip.

The illustrative special processing unit(s) 114, 116 are embodied as at least one processor and/or processor core or logical section(s) of a single core 140 (which may be referred to herein simply as "nodes" for ease, of description). In some embodiments, one or more of the special processing units 114, 116 has a different instruction set architecture (ISA) than the central processing unit (e.g., the computing device 100 comprises a heterogeneous platform). One or more of the nodes 140 may be configured to process multi-threaded computer programs. The nodes 140 include or are communicatively coupled to one or more cache memory 142. The cache(s) 142 may be utilized to temporarily store data and/or instructions during operation of the release consistency application 148, the pre-fetcher SPU logic 150, and/or other components of the computing device 100.

In addition to the cache memory 142, the nodes 140 include, or are otherwise communicatively coupled to, the memory 144. Portions of the memory 144 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The one or more SPUs 114, 116 may be communicatively coupled to the CPU 110 directly (as in embodiments in which the CPU 110 is paired with an integrated SPU chipset, such as an integrated graphics chipset) or indirectly over an interface (as in embodiments in which the SPUs 114, 116 are discrete hardware components such as graphics processing units or other accelerators). The dashed arrows 160, 162, 164 are used in FIG. 1 to indicate that the connection between the SPUs 114, 116 and the CPU 110 may be either direct (if the SPU 114, 116 is integrated with the CPU 110) or indirect via the I/O subsystem 112 (if the SPU 114, 116 is a discrete device).

In embodiments where one or more of the SPUs 114, 116 is a discrete device, the illustrative I/O subsystem 112 includes a direct memory access (DMA) subsystem 156 configured to facilitate data transfer between the shared memory 134, 154 and the caches 122, 142. The illustrative DMA subsystem 156 is configured so that the SPUs 114, 116 can access the shared memory 134 independently of the processor and/or core(s) 120 and so that the CPU 110 can access the shared memory 154 independently of the processor and/or core(s) 140. In some embodiments, the DMA subsystem 156 is embodied as a DMA controller or DMA "engine," such as a Peripheral Component Interconnect (PCI) device, a Peripheral Component Interconnect-Express (PCI-Express) device, an I/O Acceleration Technology (I/OAT) device, and/or others. Each, either, or any of the SPUs 114, 116 may be embodied as, for example, a graphics card, video card, floating-point accelerator, digital signal processor, co-processor, graphics processing unit configured for general-purpose computing (e.g., a GPGPU), and/or others.

Although not specifically shown, it should be understood that the I/O subsystem 112 may be communicatively coupled to one or more storage devices, which may be embodied as any suitable device for storing data and/or instructions, such as disk storage (e.g., hard disks), memory cards, memory sticks, and/or others. In some embodiments, one or more operating systems (O/S) 126, 146, the release consistency application 128, 148, the pre-fetcher logic 130, 150 and/or shared memory address tables 132, 152 (described below) may be embodied in the storage device(s). As shown in FIG. 1, at runtime, all or portions of the illustrative operating system(s) 126, 146, release consistency application 128, 148, pre-fetcher logic 130, 150 and/or shared memory address tables 132, 152 may be loaded from the storage device(s) into the memory 124, 144 and/or the cache(s) 122, 142 for faster processing or other reasons.

It should be appreciated that the computing device 100 may include other components, sub-components, and devices not illustrated in FIG. 1 (such as peripheral devices, network interfaces, and/or others) for clarity of the description. In general, the components of the computing device 100 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

Figure 2:
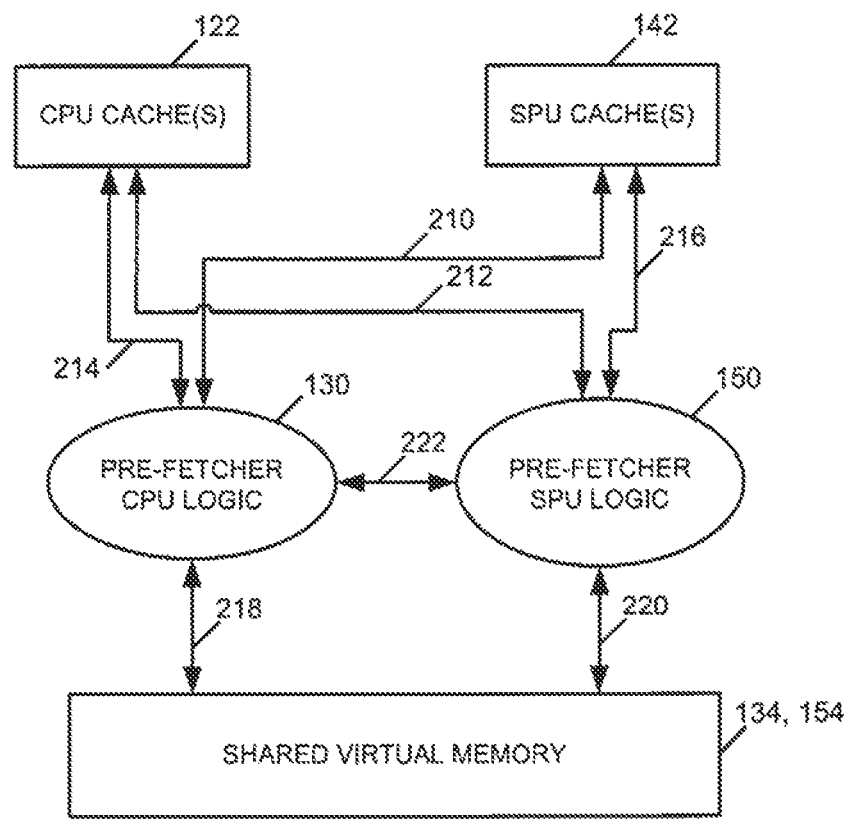
FIG. 2 is a simplified module diagram for at least one embodiment of a release consistency protocol.

In the illustrative embodiments, the shared virtual memory 134, 154 is divided into blocks of contiguous virtual memory addresses (e.g., pages). The size of each page (e.g., page granularity) may vary according to the requirements of particular embodiments, but may be in the range of about four kilobytes or more, in the illustrative embodiments. Referring now to FIG. 2, the pre-fetcher SPU logic 150 interfaces with the pre-fetcher CPU logic 130 to maintain release consistency of the pages in the shared virtual memory 134, 154 and the caches 122, 142. The bi-directional arrows 210, 212, 214, 216, 218, 220 represent transfers of pages between the shared virtual memory 134, 154 and the caches 122, 142. It should be understood by those skilled in the art that use of the term "transfer" herein in the context of data propagation between or among components of the computing device 100 is intended to encompass physical and/or logical transfers. For example, in some embodiments, a "logical" transfer may include simply making the memory address of a requested page known to a requesting component, without explicitly moving data from one location to another.

When the central processing unit 110 executing a computer program (e.g., a software application) offloads a computing operation (such as a resource-intensive computation) to one of the SPUs 114, 116, the SPU 114, 116 receiving the offload request initiates the transfer of the page containing the data needed for the operation from the shared virtual memory 134, 154 to its cache 142, as soon as the computing operation is offloaded. As described in more detail with reference to FIG. 3, the pre-fetcher SPU logic 150 determines a range of pages contiguous with the requested page in the shared memory 134, 154 (e.g., a block of virtual memory), and interfaces with the pre-fetcher CPU logic 130 to effectuate a transfer of those pages from the shared memory 134, 154 to the cache 142.

Figure 3:
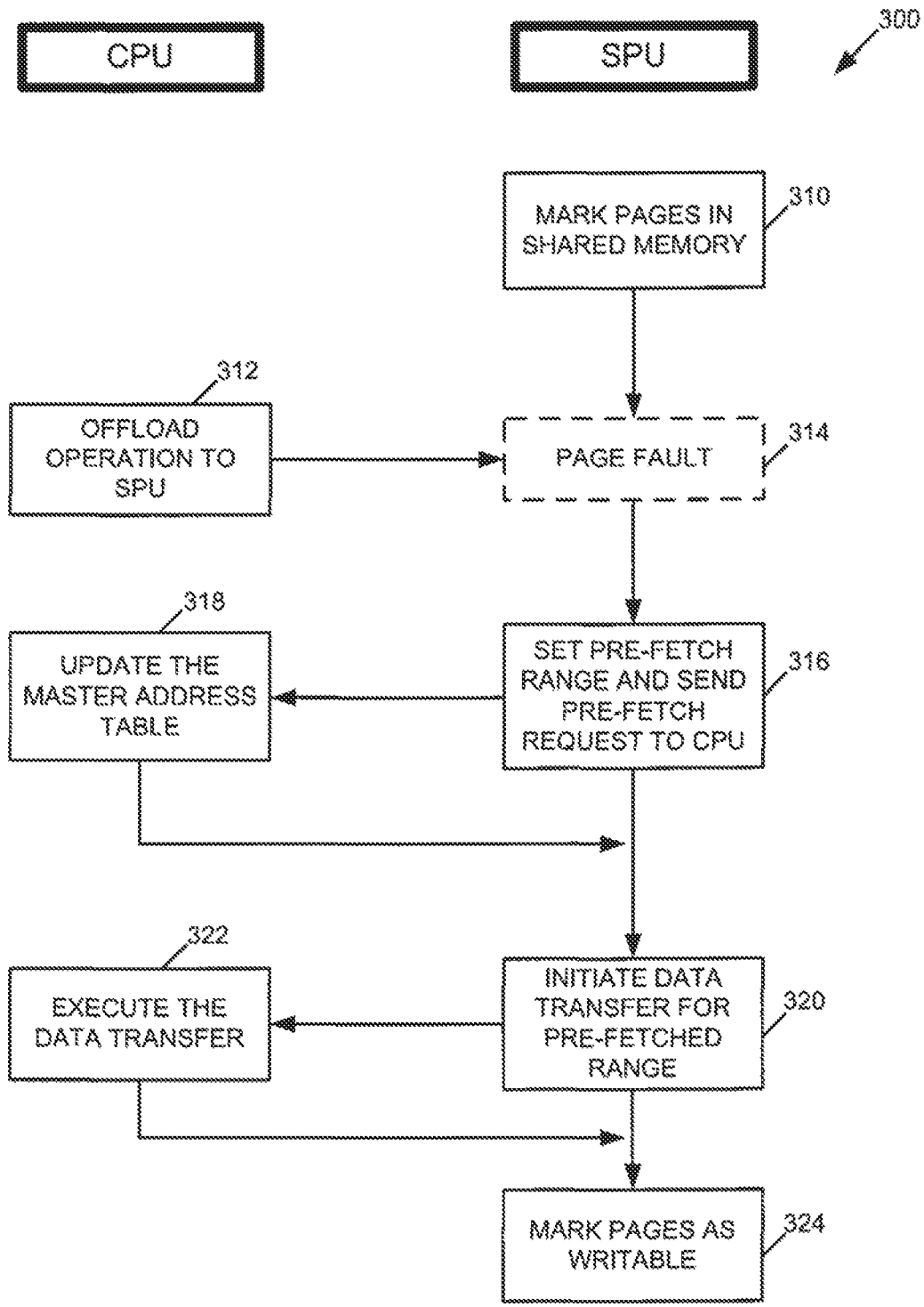
FIG. 3 is a simplified flow diagram of at least one embodiment of a method for maintaining release consistency in shared memory programming.

Referring now to FIG. 3, an illustrative method 300 for "pre-fetching" a range of pages of virtual memory from the shared memory 134, 154 is shown. The method 300 is embodied as computerized logic and/or instructions (e.g., software, firmware and/or hardware), some portions of which are executed by the central processing unit 110 and other portions of which are executed by a special processing unit 114, 116. According to the method 300, the tasks represented by blocks 312, 318, and 322 are performed by the central processing unit 110, and the tasks represented by blocks 310, 316, 320, and 324 are performed by a special processing unit 114, 116. Communication of data and instructions between the central processing unit 110 and the special processing unit 114, 116 during execution of the method 300 is facilitated by the I/O subsystem 112 and/or the DMA subsystem 156 as described above.

At block 310, the SPU 114, 116 marks all of the pages in the shared memory 134, 154 as non-accessible. In the illustrative embodiments, this may be accomplished by updating the status of the virtual memory addresses of the pages in the SPU's local shared memory address table 152 (e.g., by setting a flag or bit to a certain value associated with data non-accessibility). Marking the pages as non-accessible forces a page fault in response to a subsequent request by the SPU 114, 116 to access one or more of the marked pages (such as when a computing operation is offloaded to the SPU 114, 116).

At block 312, in the course of executing a computer program or software application, for example, the CPU 110 initiates the offloading of a computing operation (e.g., a computation) that requires access to a page in the shared memory 134, 154 to the SPU 114, 116. In some embodiments, the offloading instructions may be issued to the SPU 114, 116 via an application programming interface (API) or other computer programming mechanism, for example. As the pages of shared memory 134, 154 have been marked as non-accessible, the attempt to access the requested page traps in a page fault at block 314. Block 314 is illustrated with dashed lines to indicate that it represents the occurrence of an event (the page fault) and not program logic or instructions of the method 300.

In response to the page fault, the SPU 114, 116 determines a range of virtual memory addresses in the shared memory 134, 154 that include and are continuous with the requested page, in some embodiments, the range of virtual memory addresses may be pre-determined. Alternatively or in addition, the range of virtual memory addresses may be determined or updated at runtime. The range of contiguous virtual memory addresses or block of virtual memory may include some addresses that are lower than the address of the requested page and/or some addresses that are higher than the address of the requested page. In some embodiments, the range of addresses is determined so that the requested page is at about the middle of the range or so that the range of addresses is arranged symmetrically relative to the requested page. In some embodiments, the range of addresses may correspond to a list of pages, such as a list of "dirty" pages (e.g., pages that are in use) maintained by the CPU 110. In some embodiments, the range of addresses may be customized or optimized according to one or more design or implementation requirements for the SPU 114, 116, the shared memory 134, 154, the DMA subsystem 156, and/or other components or factors. The size of the data set (range of addresses) may be configured based on the requirements or aspects of a particular design or implementation of the computing device 100, the SPU 114, 116, the shared memory 134, 154, the DMA subsystem 156, and/or other components or factors. In some embodiments, the size of the pre-fetch data set (range of addresses) may be in the range of about 512 kilobytes to about one megabyte. Once the parameters of the pre-fetch range are set, the SPU 114, 116 sends a pre-fetch message requesting the addresses in the pre-fetch range (or the data associated with the addresses in the pre-fetch range) to the CPU 110. In some embodiments, the pre-fetch message may include data relating to a first or starting virtual memory address and data relating to as second or ending virtual memory address. In other embodiments, the pre-fetch message may include data relating to a starting or ending virtual memory address and the desired length or size of the range (e.g., one megabyte).

At block 318, the CPU 110 processes the pre-fetch message and updates the shared memory master address table 132 (e.g., by setting a flag or bit to a certain value) to indicate to the CPU 110 and all of the SPUs 114, 116 that the data associated with the pre-fetch range is being acquired by the requesting SPU 114, 116.

At block 320, the requesting SPU 114, 116 initiates the transfer of the pages in the pre-fetch range from the shared memory 134, 154 to its local cache 142, during the page fault. In embodiments where the requesting SPU 114, 116 is a discrete component, this may involve initiating a direct memory access transaction via the DMA subsystem 156. In other embodiments, e.g., where the requesting SPU 114, 116 is an integrated component, this may simply involve initiating a direct transfer via the I/O subsystem 112. Responsive to the instructions received from the requesting SPU 114, 116 at block 320, the CPU 110 executes the data transfer (e.g., DMA transaction or direct transfer) at block 322. Once the transfer is complete, the requesting SPU 114, 116 marks the transferred pages as available for write operations at the SPU 114, 116 (e.g., by setting a flag or bit to a certain value in the local shared memory address table 152), so execution of subsequent instructions or logic associated with the O/S 126, 146, the application 128, 148 or one or more other applications or threads running on the CPU 110 and/or the SPUs 114, 116, can continue.

EXAMPLES

Illustrative examples of the devices, systems, and methods disclosed herein are provided below. An embodiment of the devices, systems, and methods may include any one or more, and any combination of the examples described below.

In one example, at least one computing device may be configured to maintain release consistency. The at least one computing device may include a first processing unit, at least one first memory device coupled to the first processing unit, a second processing unit, and at least one second memory device coupled to the second processing unit, where at least one of the first and second memory devices having stored therein a plurality of instructions that when executed by the first and second processing units, cause the second processing unit to configure shared memory of the computing device so that in response to a page fault the second processing unit: determines a number of memory addresses in the shared memory greater than one and less than all of the memory addresses in the shared memory; sends a request to the first processing unit to transfer data associated with the determined number of memory addresses to the second processing unit; and marks the transferred data as available for at least one write operation.

In an example, the at least one computing device may be configured to initiate the page fault by marking the shared memory as non-accessible prior to requesting access to the shared memory. In an example, the at least one computing device is configured to mark the shared memory as non-accessible by updating a virtual memory address table stored at the second processing unit. In an example, the memory addresses may include a fixed-length, contiguous range of virtual memory addresses. In an example, the first processing unit may include a central processing unit and the second processing unit may include a special-purpose processing unit. In an example, the second processing unit may include a hardware accelerator. In an example, the second processing unit may include at least one of a graphics card, video card, floating-point accelerator, digital signal processor, co-processor, and graphics processing unit configured for general-purpose computing. In an example, the at least one computing device may include a many integrated core architecture. In an example, the first processing unit and the second processing unit may have different instruction set architectures. In an example, the at least one computing device may include a direct memory access subsystem communicatively coupling the first processing unit and the second processing unit. In an example, the direct memory access subsystem may include at least one of a Peripheral Component Interconnect device and a Peripheral Component Interconnect-Express device. In an example, the determined number of memory addresses to request may correspond to a block of memory having a size in the range of about 512 kilobytes to about 1 megabyte. In an example, the number of memory addresses to request may correspond to a block of memory and the at least one computing device is configured to determine the size of the block of memory at runtime. In an example, the at least one computing, device may include a direct memory access subsystem, wherein the at least one computing device is configured to determine the size of the block of memory based on at least one characteristic of the direct memory access subsystem. In an example, the number of memory addresses to request may correspond to a plurality of pages having a page granularity in the range of about four kilobytes. In an example, the at least one computing device may be configured to determine the number of memory addresses to request based on at least one of a list of pages needed for execution of an instruction and a plurality of pages adjacent a page needed for execution of the instruction.

In another example, at least one computing device may be configured to maintain release consistency, and may include a first processing unit, at least one first memory device coupled to the first processing unit, at least one second processing unit, and at least one second memory device coupled to the at least one second processing unit. In an example, at least one of the first and second memory devices may have stored therein a plurality of instructions that when executed by at least one of the first and second processing units, cause the first processing unit to: offload a computing operation to the second processing unit, and in response to offloading the computing operation; receive a request from the second processing unit for a plurality of pages in shared memory of the computing device comprising more than one and less than all of the pages in shared memory; update a memory address table in response to the request; and transfer data associated with the requested pages to the second processing unit.

In an example, the first processing unit and the second processing unit may include different instruction set architectures. In an example, the at least one computing device may include a many integrated core architecture. In an example, the requested plurality of pages may correspond to a range of contiguous, fixed-length pages of virtual memory. In an example, the request for a plurality of pages in shared memory corresponds to a list of pages needed for execution of an instruction. In an example, the request for a plurality of pages in shared memory may correspond to a page needed for execution of an instruction and a plurality of pages adjacent the page needed for execution of the instruction. In an example, the memory address table may be stored at the first computing device. In an example, the at least one computing device is configured to use direct memory access to transfer data associated with the requested pages to the second processing unit.

In another example, a method for maintaining release consistency may include, on a computing device comprising at least one first processing; unit and at least one second processing unit: initiating a page fault at a second processing unit; in response to the page fault, determining a number of contiguous pages in virtual memory shared by the second processing unit and a first processing unit, the number of pages being greater than one and less than the entire shared memory; initiating transfer of the pages from the first processing unit to the second processing unit; and in response to receiving the pages at the second processing unit, marking the pages as available for at least one write operation. In an example, the method includes determining the number of contiguous pages in the shared virtual memory based on at least one characteristic of a direct memory access subsystem of the computing device. In an example, the method may include determining the number of contiguous pages in the shared virtual memory based on at least one of a page needed for execution of an instruction and at least one page adjacent the page needed for execution of the instruction, in an example, the method may include determining the number of contiguous pages in the shared virtual memory at runtime.

In an example, a computing device may be configured to maintain release consistency, and may include at least one processor; and computer circuitry coupled to the at least one processor, where the computer circuitry may be arranged to cause the at least one processor to perform any of the foregoing methods. In an example, at least one computer accessible medium may include a plurality of instructions that in response to being executed result in a computing device performing any of the foregoing methods.

In another example, a method for maintaining release consistency may include, on a computing device including at least one first processing unit, at least one second processing unit, virtual memory shared by the at least one first processing unit and the at least one second processing unit, and at least one direct memory access subsystem having a data transfer bandwidth: marking the shared virtual memory so that a page fault is initiated in response to a request to access data in the shared memory and, in response to the page fault: determining an amount of the shared virtual memory less than the total amount of shared memory and large enough to fully utilize the data transfer bandwidth of the direct memory access subsystem; and initiating the transfer of data associated with the determined amount of shared virtual memory from the first processing unit to the second processing unit using the direct memory access subsystem, in an example, the method may include determining the amount of shared virtual memory based on at least one of a page needed for execution of an instruction and at least one page adjacent the page needed for execution of the instruction. In an example, the method may include determining the amount of shared virtual memory at runtime.

In another example, a computing device may be configured to maintain release consistency, and may include at least one processor; and computer circuitry coupled to the at least one processor, where the computer circuitry may be arranged to cause the at least one processor to perform any of the foregoing methods. In an example, at least one computer accessible medium may be configured to maintain release consistency, and may include a plurality of instructions that in response to being executed result in a computing device performing any of the foregoing methods.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. Further, while aspects of the present disclosure have been described in the context of a heterogeneous multi-core system, it will be understood that the various aspects have other applications, for example, any application in which it is desired to provide memory coherence management among multiple processors or cores. Such applications may include, for example, any application in which an accelerator or similar device is used to accelerate applications or portions of applications running on a central processing unit (such a applications in which a general purpose graphics processing unit or GPGPU is used).

The invention claimed is:

1. At least one computing device to maintain release consistency, comprising:
   a first processing unit;
   at least one first memory device coupled to the first processing unit;
   a second processing unit; and
   at least one second memory device coupled to the second processing unit;
   the first or the second memory device having stored therein a plurality of instructions that when executed by the first and second processing units, cause the second processing unit to configure shared memory of the computing device so that in response to a page fault the second processing unit:
   determines a number of memory addresses in the shared memory greater than one and less than all of the memory addresses in the shared memory;
   sends a request to the first processing unit to transfer data associated with the determined number of memory addresses to the second processing unit; and
   marks the memory address for the transferred data as available for at least one write operation.

2. The at least one computing device of claim 1, wherein the at least one computing device is configured to initiate the page fault by marking the shared memory as non-accessible prior to requesting access to the shared memory.

3. The at least one computing device of claim 2, wherein the at least one computing device is configured to mark the shared memory as non-accessible by updating a virtual memory address table stored at the second processing unit.

4. The at least one computing device of claim 1, wherein the memory addresses comprise a fixed-length, contiguous range of virtual memory addresses.

5. The at least one computing device of claim 1, wherein the first processing unit comprises a central processing unit and the second processing unit comprises a special-purpose processing unit.

6. The at least one computing device of claim 1, wherein the second processing unit comprises a hardware accelerator.

7. The at least one computing device of claim 1, wherein the second processing unit comprises a graphics card, a video card, a floating-point accelerator, a digital signal processor, a co-processor, and a graphics processing unit configured for general-purpose computing.

8. The at least one computing device of claim 1, comprising a many integrated core architecture.

9. The at least one computing device of claim 1, wherein the first processing unit and the second processing unit have different instruction set architectures.

10. The at least one computing device of claim 1, comprising a direct memory access subsystem communicatively coupling the first processing unit and the second processing unit.

11. The at least one computing device of claim 10, wherein the direct memory access subsystem comprises a Peripheral Component Interconnect device or a Peripheral Component Interconnect-Express device.

12. The at least one computing device of claim 1, wherein the determined number of memory addresses to request corresponds to a block of memory having a size in the range of about 512 kilobytes to about 1 megabyte.

13. The at least one computing device of claim 1, wherein the number of memory addresses to request corresponds to a block of memory and the at least one computing device is configured to determine the size of the block of memory at runtime.

14. The at least one computing device of claim 13, comprising a direct memory access subsystem, wherein the at least one computing device is configured to determine the size of the block of memory based on at least one characteristic of the direct memory access subsystem.

15. The at least one computing device of claim 1, wherein the number of memory addresses to request corresponds to a plurality of pages having a page granularity in the range of about four kilobytes.

16. The at least one computing device of claim 1, wherein the at least one computing device is configured to determine the number of memory addresses to request based on a list of pages needed for execution of an instruction or a plurality of pages adjacent a page needed for execution of the instruction.

17. At least one computing device configured to maintain release consistency, comprising:
    a first processing unit;
    at least one first memory device coupled to the first processing unit;
    at least one second processing unit; and
    at least one second memory device coupled to the at least one second processing unit;
    the first or the second memory device having stored therein a plurality of instructions that when executed by the first processing unit or the second processing unit, cause the first processing unit to:
    offload a computing operation to the second processing unit, and in response to offloading the computing operation:
    receive a request from the second processing unit for a plurality of pages in shared memory of the computing device comprising more than one and less than all of the pages in shared memory;
    update a memory address table in response to the request; and
    transfer data associated with the requested pages to the second processing unit.

18. The at least one computing device of claim 17, comprising a direct memory access subsystem communicatively coupling the first processing unit and the second processing unit.

19. A method for maintaining release consistency, comprising:
    on a computing device comprising at least one first processing unit and at least one second processing unit:
    initiating a page fault at a second processing unit;
    in response to the page fault, determining a number of contiguous pages in virtual memory shared by the second processing unit and a first processing unit, the number of pages being greater than one and less than the entire shared memory;

initiating transfer of the pages from the first processing unit to the second processing unit; and in response to receiving the pages at the second processing unit, marking the pages as available for at least one write operation.

20. The method of claim 19, comprising determining the number of contiguous pages in the shared virtual memory based on: a characteristic of a direct memory access subsystem of the computing device, a page needed for execution of an instruction, or at least one page adjacent the page needed for execution of the instruction.

21. A method for maintaining release consistency, comprising:

on a computing device comprising at least one first processing unit, at least one second processing unit, virtual memory shared by the at least one first processing unit and the at least one second processing unit, and at least one direct memory access subsystem having a data transfer bandwidth:

marking the shared virtual memory so that a page fault is initiated in response to a request to access data in the shared memory and, in response to the page fault:

determining an amount of the shared virtual memory less than the total amount of shared memory and large enough to fully utilize the data transfer bandwidth of the direct memory access subsystem; and initiating the transfer of data associated with the determined amount of shared virtual memory from the first processing unit to the second processing unit using the direct memory access subsystem.

22. The method of claim 21, comprising receiving the request to access data in the shared memory at the computing device and initiating the page fault in response to the request to access data in the shared memory.

* * * * *